United States Patent
Hoshino (10) Patent No.: US 8,013,596 B2
(45) Date of Patent: Sep. 6, 2011

(54) POSITION DETECTOR AND POSITIONING DEVICE

(75) Inventor: Takayuki Hoshino, Osaka (JP)

(73) Assignee: Konica Minolta Opto, Inc., Hachioji-shi (JP)

(*) Notice: Subject to any disclaimer, the term of this patent is extended or adjusted under 35 U.S.C. 154(b) by 719 days.

(21) Appl. No.: 11/887,994

(22) PCT Filed: Mar. 14, 2006

(86) PCT No.: PCT/JP2006/304989
§ 371 (c)(1),
(2), (4) Date: Oct. 5, 2007

(87) PCT Pub. No.: WO2006/109384
PCT Pub. Date: Oct. 19, 2006

(65) Prior Publication Data
US 2009/0039875 A1 Feb. 12, 2009

(30) Foreign Application Priority Data
Apr. 6, 2005 (JP) .................. 2005-109364

(51) Int. Cl.
*G01B 7/14* (2006.01)
(52) U.S. Cl. ............... 324/207.24; 396/87; 324/207.2; 324/207.21
(58) Field of Classification Search ............ 324/207.24, 324/207.2, 207.21; 396/87
See application file for complete search history.

(56) References Cited

U.S. PATENT DOCUMENTS

| | | | |
|---|---|---|---|
| 4,731,579 A * | 3/1988 | Petersen et al. | 324/207.24 |
| 7,132,824 B2 * | 11/2006 | Masuda et al. | 324/207.12 |
| 7,315,164 B2 * | 1/2008 | Hata et al. | 324/207.24 |
| 2005/0232094 A1 * | 10/2005 | Hoshino | 369/44.11 |

FOREIGN PATENT DOCUMENTS

| | | |
|---|---|---|
| JP | 1-150812 A | 6/1989 |
| JP | 3-122318 U | 12/1991 |
| JP | 4-278416 A | 10/1992 |
| JP | 11-6744 A | 1/1999 |
| JP | 2000-249573 A | 9/2000 |
| JP | 2001-91298 A | 4/2001 |
| JP | 2004-56721 A | 2/2004 |
| JP | 2004-348173 A | 12/2004 |
| WO | WO 2006/109384 A1 | 10/2006 |

OTHER PUBLICATIONS

Japanese "Notice of Reason for Refusal," dated Feb. 17, 2009, for counterpart Japanese Application No. 2005-109364, together with an English-language translation thereof.
Notification of Transmittal of Translation of the International Preliminary Report on Patentability dated Mar. 6, 2008, for counterpart International Application No. PCT/JP2006/304989.
PCT "International Preliminary Report on Patentability Chapter II (IPEA/409)", dated Apr. 6, 2007 for counterpart International Patent Application No. PCT/JP2006/304989 together with English-language translation thereof (translation of amended claims not included).

* cited by examiner

Primary Examiner — Patrick Assouad
Assistant Examiner — David M. Schindler
(74) Attorney, Agent, or Firm — Sidley Austin LLP (57) ABSTRACT

A position detector (3) capable of obtaining an output having a linearity in a wide range includes: a magnetic field generating member (11) attached to a movable member (10) movable in a predetermined movable direction (x); and magnetic field detection means (12) for detecting a magnetic field change caused by movement of the magnetic field generating member (11). The magnetic field generating member (11) includes an N-pole portion (13) magnetized into N-pole, an S-pole portion (14) magnetized into S-pole arranged in the movable direction with the N-pole portion (13), and a non-magnetized portion (15) not magnetized between the N-pole portion (13) and the S-pole portion (14).

16 Claims, 7 Drawing Sheets

PRIOR ART

Fig. 12

PRIOR ART

Fig. 13

PRIOR ART

POSITION DETECTOR AND POSITIONING DEVICE

RELATED APPLICATIONS

This application is a National Stage of International Application No. PCT/JP2006/304989, filed Mar. 14, 2006, which is based on Japanese Patent Application No. 2005-109364 filed with Japanese Patent Office on Apr. 6, 2005, the entire content of which is incorporated herein by reference.

TECHNICAL FIELD

The present invention relates to a position detector and a positioning device.

BACKGROUND ART

Figure 11:
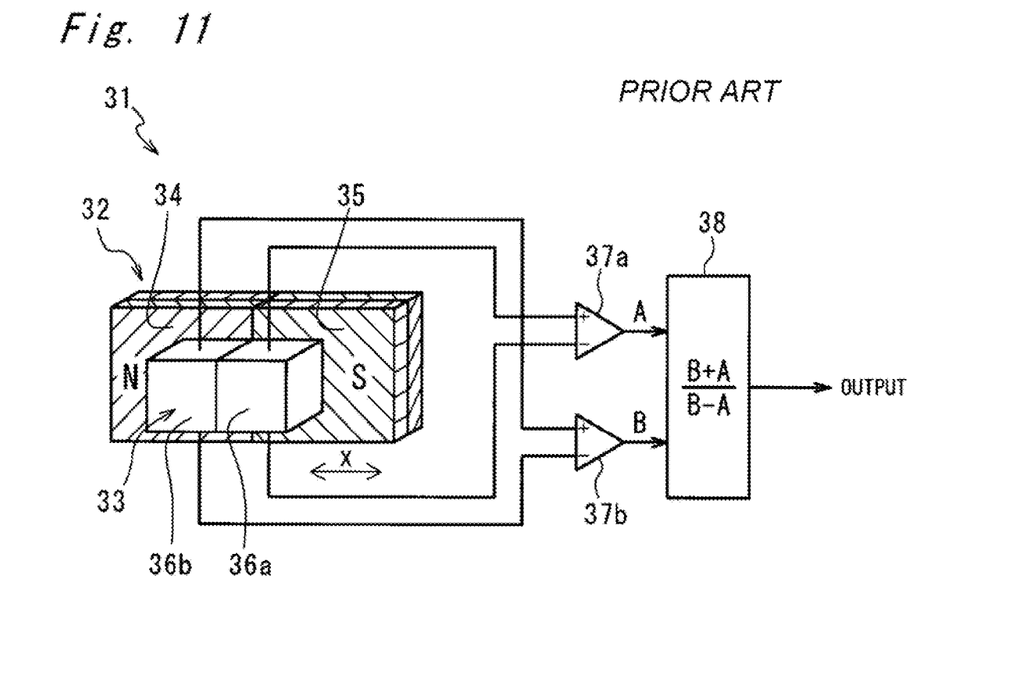
FIG. 11 is a schematic view showing the structure of a conventional position detector.

Described in Patent Documents 1 to 3 are position detectors in which a position of a movable member is detected by a magnetic field detecting means as a change of magnetic field caused by a magnetic field generating member attached to the movable member.
Patent document 1: JP H01-150812 A
Patent document 2: JP 2004-348173 A
Patent document 3: JP 2001-91298 A FIG. 11 shows a position detector 31 described in Patent Document 1. The position detector 31 uses a magnetic field detecting means 33 to detect a change of magnetic field generated by a magnetic field generating member 32, and calculates the position of the magnetic field generating member 32. A half of the magnetic field generating member 32 is an N-pole portion 34 magnetized to be N-pole, while the other half is an S-pole portion 35 magnetized to be S-pole.

Figure 12:
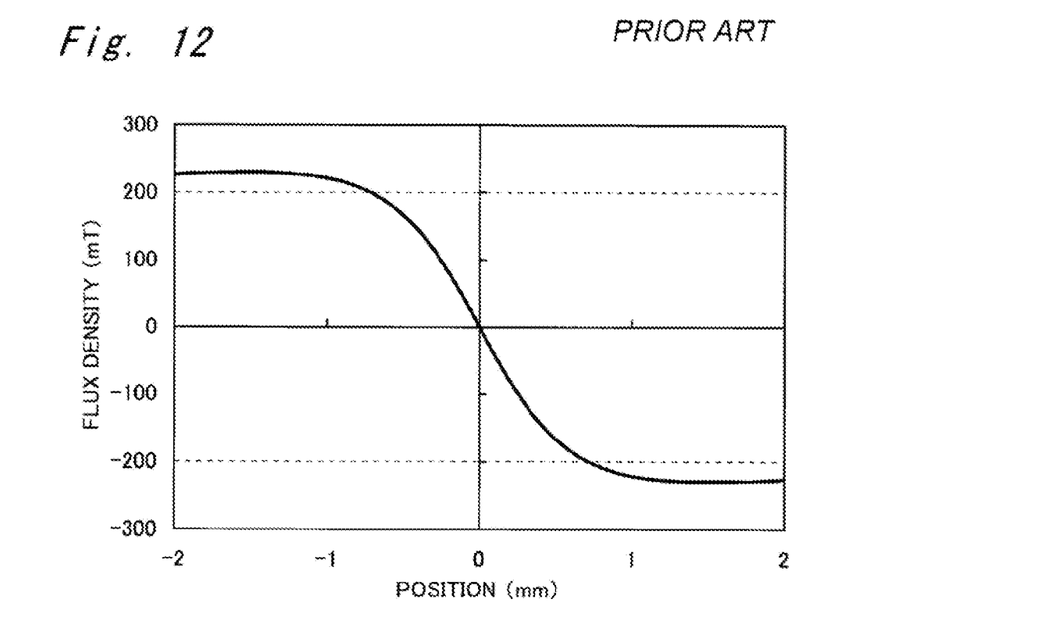
FIG. 12 is a graph view showing the distribution of a magnetic field generated by a magnetic field generating member of FIG. 11.

When the magnetic field generating member 32 is 6.5 mm in length in a movable direction, 2.5 mm in width, and 1 mm in thickness, a flux density distribution as shown in FIG. 12 is acquired. This position detector 31 has the problem that an accurate position can be detected only in the narrow range where a change of a flux density is linear.

Moreover, in Patent Document 1, the magnetic field detecting means 33 is composed of two Hall elements (magnetic field detecting elements) 36a and 36b, and a change of magnetic field due to temperature change and the like is compensated by varying an input current with use of a difference between outputs by two Hall elements 36a and 36b. In Patent Document 2, the sum of the outputs of two Hall elements (magnetic field detecting elements) 36a and 36b is divided by a difference between the outputs, by which a change of magnetic field due to a mounting error of the magnetic field generating member 32 and the magnetic field detecting means 33, temperature change and the like is compensated.

Figure 13:
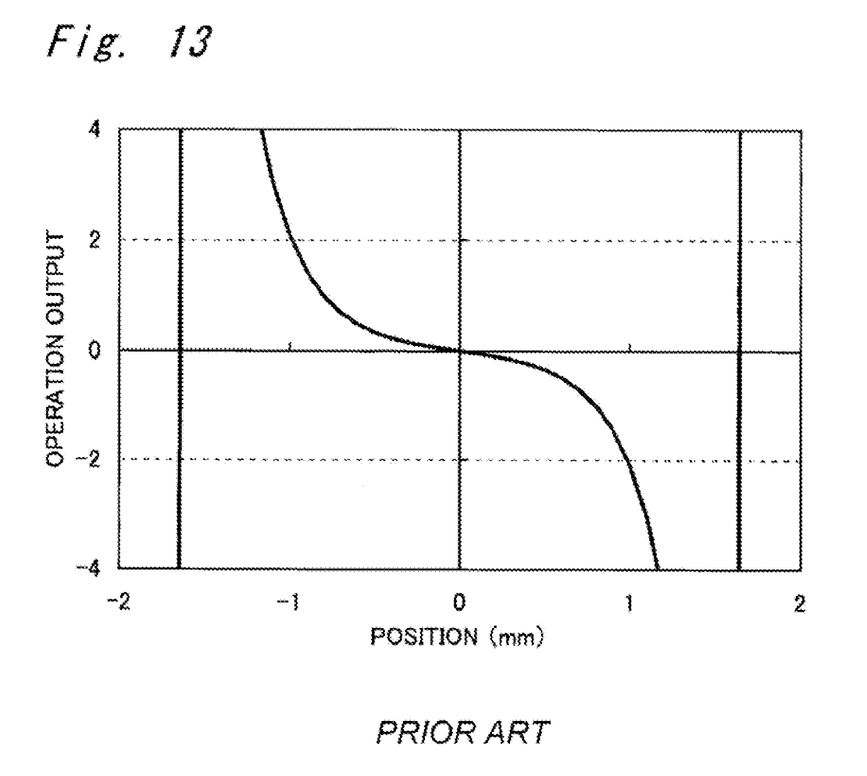
FIG. 13 is a graph view showing a change of outputs from the position detector of FIG. 10.

FIG. 13 shows a change of an output obtained by dividing the sum of the outputs by a difference between the outputs when the magnetic field detection centers of two Hall elements 36a and 36b are distanced by 1.6 mm. Naturally, this operation does not spread the linear range where the output is linear, and the problem that the position can be detected only in the narrow range still remains.

In Patent Document 3, a position detector is described which generates magnetic flux using a wedge-shaped magnet, the magnetic flux being linearly changed by the position of a magnetic field generating member. However, such a position detector has the problem that an error and individual difference are large because a magnetic field changes when a relative position shifts in the direction perpendicular to the movable direction of the magnetic field generating member and a magnetic field detecting means.

DISCLOSURE OF INVENTION

Problems to be Solved by the Invention

An object of the present invention is to provide, in view of the problems, a position detector capable of obtaining an output having linearity in a wide range, and to provide a positioning device capable of performing accurate positioning in a wide range with use of such a position detector.

Means to Solve the Problems

In order to solve the above problems, a position detector in a first aspect of the present invention includes a magnetic field generating member comprising an N-pole portion magnetized to be N-pole; an S-pole portion magnetized to be S-pole located side by side with the N-pole portion in the movable direction; and a non-magnetized portion which is not magnetized and which is located between the N-pole portion and the S-pole portion, and attached to a movable member movable in a predetermined movable direction; magnetic field detecting means having two magnetic field detecting elements juxtaposed in the movable direction for detecting a change of magnetic field and detecting a change of magnetic field caused by movement of the magnetic field generating member; and operation means which carries out an operation of: $(A-B)/(A+B)+2$ if $A>0$; $(A-B)/(A+B)-2$ if $B<0$; and $(B+A)/(B-A)$ if $A \leqq 0$ and $B \geqq 0$, wherein A represents a smaller detection signal in a linear range, out of detection signals by the two magnetic field detecting elements, and B represents a larger detection signal.

According to this structure, since the range of a linear change of the magnetic field created by the magnetic field generating member is increased by the presence of the non-magnetized portion, the magnetic field detecting means can detect the position of the magnetic field generating member in a wide range.

Moreover, according to this structure, operation means carries out an operation of $(B+A)/(B-A)$ wherein A represents a smaller detection signal in a linear range, out of detection signals by the two magnetic field detecting elements, and B represents a larger detection signal.

According to this structure, stabilized position detection can be achieved since an output is not affected by the change of the magnetic field caused by a mounting error of the magnetic field generating member and the magnetic field detecting means as well as temperature change and the like.

In the position detector of the first aspect of the present invention, a length of the non-magnetized portion in the movable direction may be $\frac{1}{10}$ or more and $\frac{1}{3}$ or less of an overall length of the magnetic field generating member.

According to this structure, since the change in inclination of a position detection output becomes not more than 5 times if the length of the non-magnetized portion is made to be $\frac{1}{10}$ or more and $\frac{1}{3}$ or less, a system is stabilized in the case where feedback control is performed with a detection signal.

In the position detector in the first aspect of the present invention, the operation means may carry out operations of $(A-B)/(A+B)+2$ if $A>0$, $(A-B)/(A+B)-2$ if $B<0$, and $(B+A)/(B-A)$ if $A \leqq 0$ and $B \geqq 0$, wherein A represents a smaller detection signal in a linear range, out of detection signals by the two magnetic field detecting elements, and B represents a larger detection signal.

According to this structure, in the case of A>0 B<0 where either of the detection signals A and B from two magnetic field detecting elements is no longer linear, outputs with still high linearity may be obtained by performing the operation of dividing a difference between both outputs by the sum of the outputs, so that the position of the magnetic field generating member can be detected in a wide range.

A position detector in a second aspect of the present invention includes a magnetic field generating member attached to a movable member movable in a predetermined movable direction, and a magnetic field detecting means for detecting a change of magnetic field caused by movement of the magnetic field generating member, wherein the magnetic field detecting means has two magnetic field detecting elements juxtaposed in the movable direction for detecting a change of magnetic field, the position detector further including an operation means for carrying out operations of $(A-B)/(A+B)+2$ if $A>0$, $(A-B)/(A+B)-2$ if $B<0$; and $(B+A)/(B-A)$ if $A \leqq 0$ and $B \geqq 0$, wherein A represents a smaller detection signal in a linear range, out of detection signals by the two magnetic field detecting elements, and B represents a larger detection signal.

According to this structure, in the case where either of the detection signals by two magnetic field detecting elements becomes nonlinear, outputs with still high linearity may be obtained by performing the operation of dividing a difference between both outputs by the sum of the outputs, so that the position of the magnetic field generating member can be detected in a wide range.

In the position detector in the first and second aspects of the present invention, the magnetic field detecting element may be a Hall element.

According to this structure, low-cost high-precision position detectors can be implemented by using general Hall elements.

A position detector in a third aspect of the present invention includes a magnetic field generating member attached to a movable member movable in a predetermined movable direction and magnetized so that N-pole and S-pole are repeated in a fixed width in the movable direction, and two magnetic field detecting means for detecting a change of magnetic field caused by movement of the magnetic field generating member, wherein the two magnetic field detecting elements are juxtaposed in the movable direction at an interval expressed as $(n/2+¼)\delta$ with respect to integer n, when a width of the N-pole and the S-pole is set to $½ \delta$, respectively, the position detector further including an operation means for carrying out operations of $(A+B)/(A-B)$ if both A and B are 0 or more, or if both A and B are 0 or less, and $(A-B)/(A+B)$ if either A or B is less than 0, wherein A and B represent detection signals by the two magnetic field detecting elements, respectively.

According to this structure, two magnetic field detecting elements output signals having the phase respectively shifted about 90 degrees with respect to the position of the magnetic field generating member. By performing the operation of dividing the sum of these two signals A and B by a difference therebetween, or the operation of dividing the difference by the sum, it becomes possible to obtain an output with high linearity approximate to generally a triangular wave with a minimum value of $-1$ and a maximum value of $+1$ with cycles of $\delta$, so that the accurate position of the magnetic field generating member can be calculated.

In the position detector in the third aspect of the present invention, the magnetic field detecting element may be a Magneto-resistive element.

According to this structure, the magnetic field detecting element can be downsized, so that the cycles $\delta$ can be made smaller, allowing implementation of a precise position detector.

A positioning device according to the present invention includes the position detector in any one of the first to third aspects in the present invention, the movable member being in frictional engagement with a drive shaft which is moved backward and forward in the movable direction by an electromechanical transducer expanded and contracted in the movable direction, the position detector being a piezoelectric actuator for slidably moving the movable member on the drive shaft by changing a rate of expansion and contraction of the electromechanical transducer.

According to this structure, the positioning device which is small in size and which can perform precise positioning can be implemented by combining the position detector capable of detecting an accurate position and a small-size piezoelectric actuator.

In the positioning device of the present invention, the movable member may hold an optical element.

According to this structure, optical apparatuses, such as small camera units, can be implemented.

Effect of the Invention

According to the present invention, a magnetic field generating member is provided, so that a wide linear range can be obtained. Moreover, a still wider linear range can be obtained with use of both the operation of diving the sum of the outputs from two magnetic field detecting elements by a difference between the outputs and the operation of diving the difference by the sum, so that the position of the magnetic field generating member can precisely be detected in a wide range.

BRIEF DESCRIPTION OF THE DRAWINGS

The present invention will be explained in detail with reference to the following accompanying drawing, in which like component members are denoted by like reference numerals, in which.

DESCRIPTION OF REFERENCE NUMERAL

1 Positioning device
2 Piezoelectric actuator
3 Position detector
8 Electromechanical transducer
9 Drive member
10 Movable member
11 Magnetic field generating member
12 Magnetic field detection means
13 N-pole portion
14 S-pole portion
15 Non-magnetized section
16a, 16b Hall element (magnetic field detecting element)
18 Arithmetic unit (operation means)
19 Lens (optical element)
21 Encoder (position detector)
22 N-pole portion
23 S-pole portion
24 Magnetic field generating member
25a, 25b Magneto-resistive element (magnetic field detecting element)
27 Arithmetic unit (operation means)
A Detection signal
B Detection signal

DETAILED DESCRIPTION OF THE INVENTION

Figure 1:
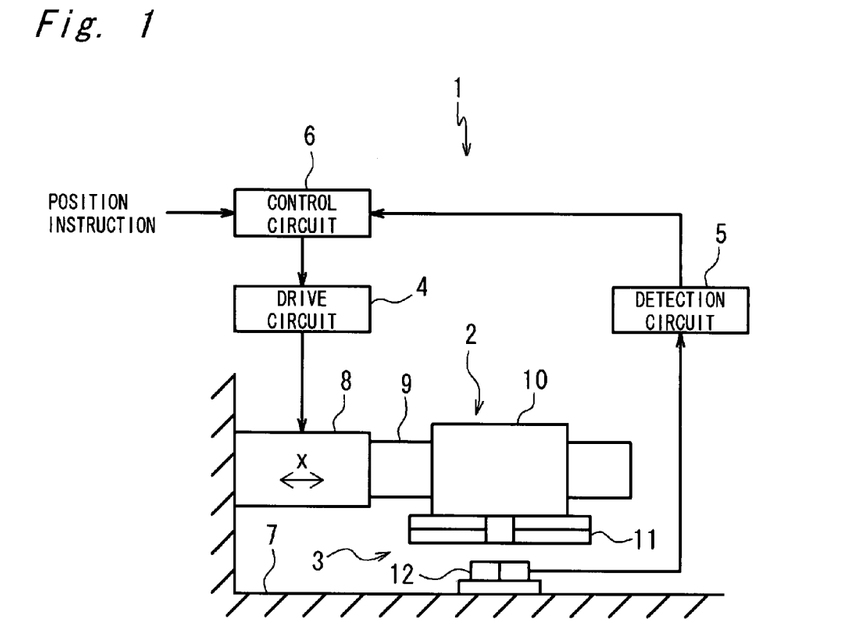
FIG. 1 is a schematic view showing the structure of a positioning device in a first embodiment of the present invention.

The embodiments of the present invention will be described hereinbelow with reference to the drawings. FIG. 1 is a schematic view showing the structure of a positioning device 1 in the first embodiment of the present invention. The positioning device 1 comprises a piezoelectric actuator 2 and a position detector 3, and has a drive circuit 4 for the piezoelectric actuator 2, a detection circuit 5 for processing detection signals of the position detector 3, and a controlling circuit 6 for controlling the drive circuit 4 so that an output of the detector 5 corresponding to the position instructed by a position instruction is obtained.

The piezoelectric actuator 2 is composed of an electromechanical transducer 8 which is fixed to a base member 7 and which is expanded and contracted by driver voltage from the drive circuit 4 in the direction x shown by an arrow, a drive member 9 which is fixed to the electromechanical transducer 8 and moves backward and forward in the direction x by the expansion and contraction of the electromechanical transducer 8, and a movable member 10 which can come into frictional engagement with the drive member 9 and can slidably move on the drive member 9.

The position detector 3 is composed of a magnetic field generating member 11 attached to the movable member 10 and a magnetic field detection means 12 fixed to the base member 7 so as to face the magnetic field generating member 11.

Figure 2:
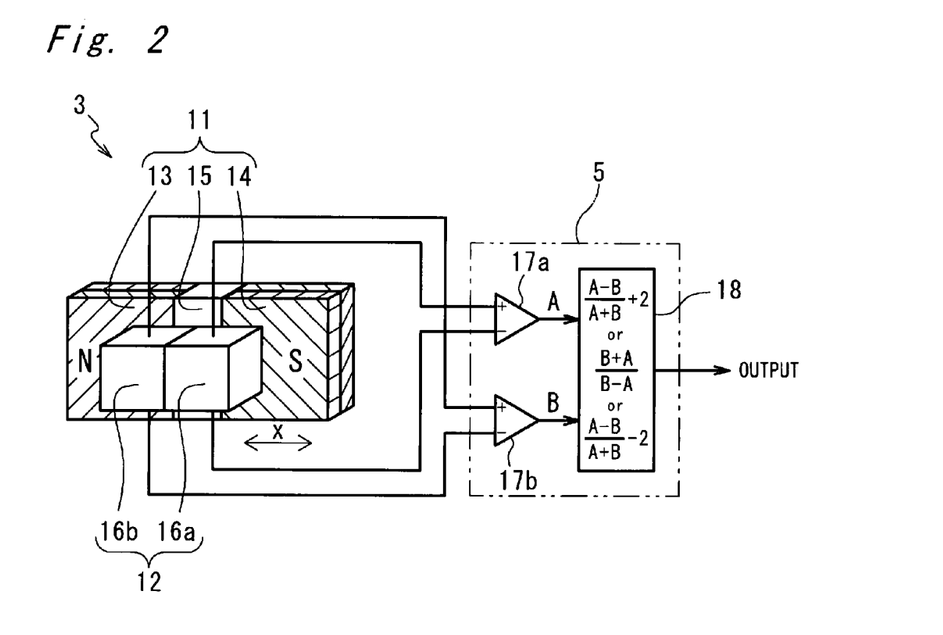
FIG. 2 is a schematic view showing the detailed structure of a position detector of FIG. 1.

Further, the structure of the position detector 3 and the detector 5 is shown in FIG. 2 in detail. The magnetic field generating member 11 is composed of an N-pole portion 13 in which the surface facing the magnetic field detection means 12 is magnetized to be N-pole, an S-pole portion 14 in which the surface facing the magnetic field detection means 12 is magnetized to be S-pole, and a non-magnetized portion 15 which is provided between the N-pole portion 13 and the S-pole portion 14 and which is not magnetized to be N-pole nor S-pole. The N-pole portion 13, the non-magnetized portion 15, and the S-pole portion 14 are juxtaposed in the direction x which is a movable direction of the movable member 10.

The magnetic field generating member 11 is dimensioned so that the overall length in the direction x may be, for example, 6.5 mm, the width may be, for example, 2.5 mm, the thickness may be, for example, 1 mm, and the length of the non-magnetized portion 15 in the direction x may be, for example, 1.2 mm. The magnetic field detection means 12 is composed of two Hall elements (magnetic field detecting elements) 16a and 16b juxtaposed in the direction x, and a distance between the centers of the portions which detect flux density is, for example, 1.6 mm. The magnetic field generating member 11 and the Hall elements 16a and 16b are distanced by, for example, 0.65 mm.

The detection circuit 5 is composed of amplifiers 17a and 17b for amplifying each detection signal of the Hall elements 16a and 16b, and an arithmetic unit (operation means) 18 for carrying out operations of:

$(A-B)/(A+B)+2$ if $A>0$;

$(A-B)/(A+B)-2$ if $B<0$; and $(B+A)/(B-A)$ if $A \leq 0$ and $B \geq 0$, wherein A is an output of the amplifier 17a (amplified detection signal of the Hall element 16a), and B is an output of the amplifier 17b (amplified detection signal of the Hall element 16b).

Description is now given of the characteristics and operation of the positioning device 1.

Figure 3:
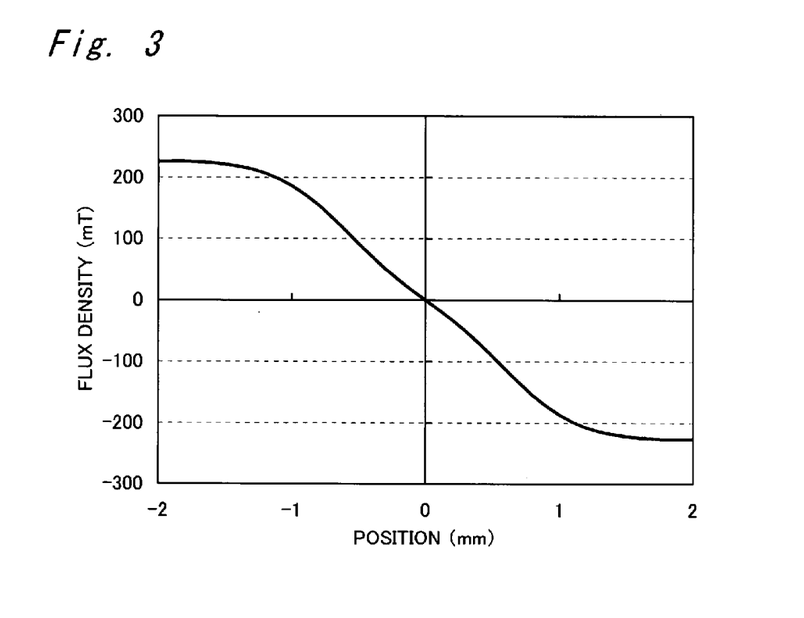
FIG. 3 is a graph view showing the distribution of a magnetic field generated by a magnetic field generating member of FIG. 2.

FIG. 3 shows the flux density corresponding to the position in the direction x in the point away by 0.65 mm from the magnetic field generating member 11. The position is indicated on condition that the center of the magnetic field generating member 11 is referred to as 0. As the non-magnetized portion 15 free from magnetization is present in the section of ±0.6 mm, the magnetic field generating member 11 has a linear range of about ±1 mm in which flux density changes linearly.

Figure 4:
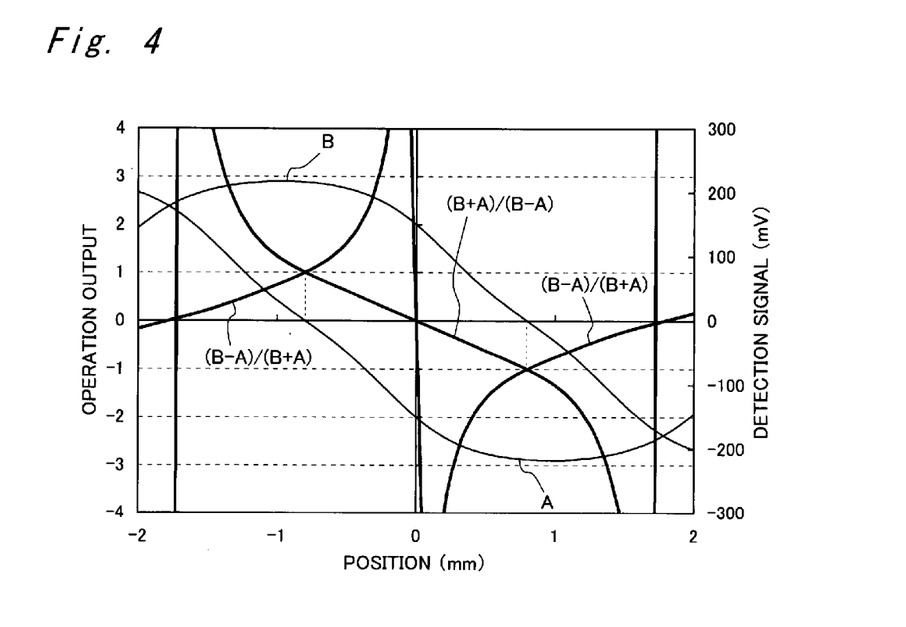
FIG. 4 is a graph view showing detection signals and outputs of the position detector of FIG. 2.

FIG. 4 shows detection signals A and B by the Hall elements 16a and 16b, an output value of the operation $(B+A)/(B-A)$, and an output value of the operation $(B-A)/(B+A)$. The detection signal A and the detection signal B are the outputs displaced by 1.6 mm, and they are $B>A$ in the linear range before and after an origin (position of 0 mm). When the change of the magnetic field of the magnetic field generating member 11 shown in FIG. 3 increases and decreases on the whole or the distance of the Hall elements 16a and 16b from the magnetic field generating member 11 is displaced, the inclination of the detection signals A and B in the linear range is different from a designed value, and so the accurate position of the magnetic field generating member 11 cannot be calculated with only the detection signal A or the detection signal B. However, the increase and the decrease of the detection signal waveform of each of the Hall elements 16a and 16b can be offset by performing the operation $(B+A)/(B-A)$ which divides the sum of the detection signals B and A by the difference between the detection signals B and A, by which a value uniquely determined by the position of the magnetic field generating member 11 can be outputted.

While the output of the operation $(B+A)/(B-A)$ has linearity in the range of about ±1 mm, the output of the operation $(B-A)/(B+A)$ takes a linear shape outside the point of about ±0.5 mm. The output of the operation (B+A)/(B−A) and the output of the operation (B−A)/(B+A) cross at the position of A=0 and the position of B=0. That is, since both the operation outputs are B/B=1 (when A=0) and A/−A=−A/A=−1 (when B=0), both the operation outputs are constantly 1 if A=0 and −1 if B=0 regardless of the waveforms of the detection signals A and B. Therefore, the accurate position of the magnetic field generating member 11 can be calculated from the output of the operation (B−A)/(B+A) when A>0 and B<0. While the output of the operation (B−A)/(B+A) in the linear range shows monotonous decrease, the output of the operation (B+A)/(B−A) in the linear range shows monotonous increase. Accordingly, calculation of the position of the magnetic field generating member 11 is simplified by obtaining an output which shows monotonous decrease by reversing (B+A)/(B−A).

Figure 5:
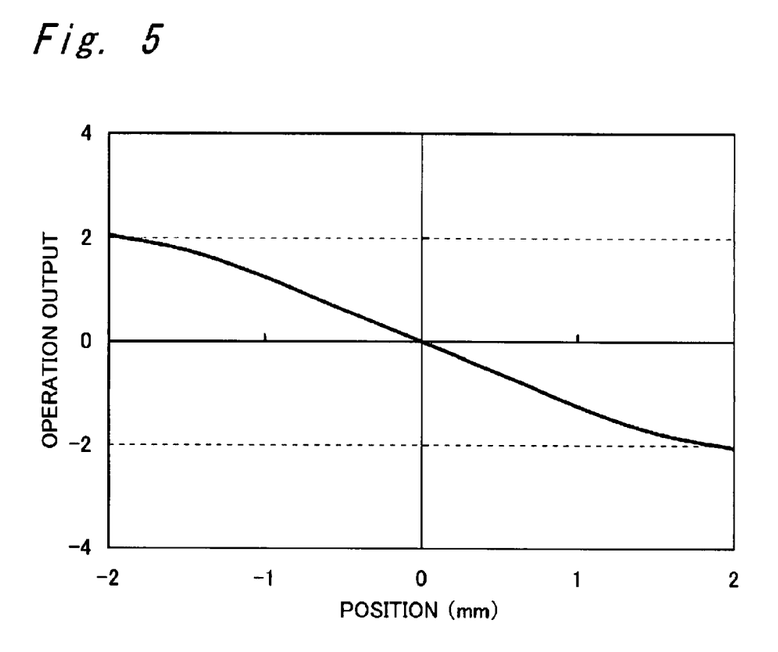
FIG. 5 is a graph view showing a change of the outputs of the position detector of FIG. 2.

FIG. 5 shows an output obtained as a result of the operations performed by the arithmetic unit 18, that is, an operation (A−B)/(A+B)+2 if A>0, an operation (A−B)/(A+B)−2 if B<0, and an operation (B+A)/(B−A) if A≦0 and B≧0. More specifically, in the range of A>0 and B<0, the operation is performed to calculate a value obtained by reversing (B+A)/(B−A) at an intersection with (B+A)/(B−A). As shown in the drawing, three operation outputs are smoothly connected and show an output change with high linearity as a whole, indicating that the accurate position of the magnetic field generating member 11 can be calculated in a wide range.

Figure 6:
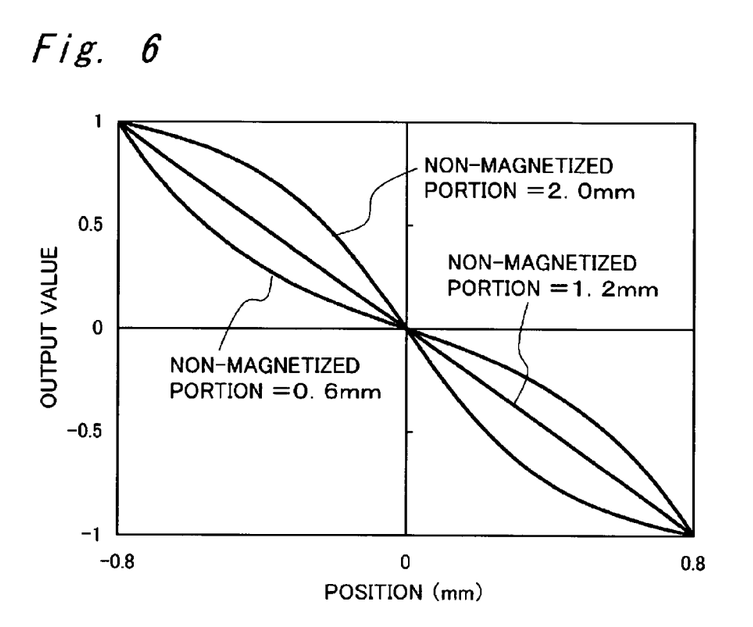
FIG. 6 is a graph view showing the outputs of the position detector with the length of a non-magnetized portion of FIG. 2 being varied.

Next, FIG. 6 shows changes of outputs from the arithmetic unit 18 corresponding to the position of the magnetic field generating member 11 in the range of A≦0 and B≧0 when the length of the non-magnetized portion 15 is 0.6 mm, 1.2 mm, and 2.0 mm. It is indicated, as shown in the drawing, that not only the linearity is not improved when the non-magnetized portion 15 is short but also the linearity is decreased when the non-magnetized portion 15 is too long.

Figure 7:
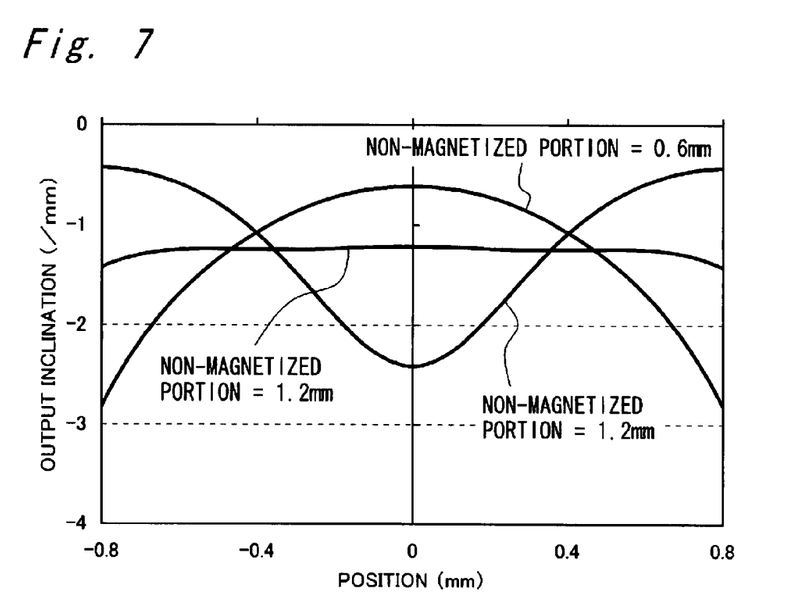
FIG. 7 is a graph view showing a change of the inclination of the outputs of FIG. 6.

FIG. 7 shows a change in inclination of the outputs in FIG. 6. Less change in inclination is desirable as it results in high linearity. As shown in FIG. 1, when an output of the detection circuit 5 is fed back to the controlling circuit 6 for positioning of the movable member 10, the change in sensibility (inclination of FIG. 7) of the position detector 3 is limited to about 5 times since it is necessary to allow for a gain margin. Therefore, the length of the non-magnetized portion 15 has a general lower limit of 0.6 mm and a general upper limit of 2.0 mm. In comparison with the length of the magnetic field generating member 11, the length of the non-magnetized portion 15 needs to be 1/10 or more and 1/3 or less of the overall length of the magnetic field generating member 11.

Figure 8:
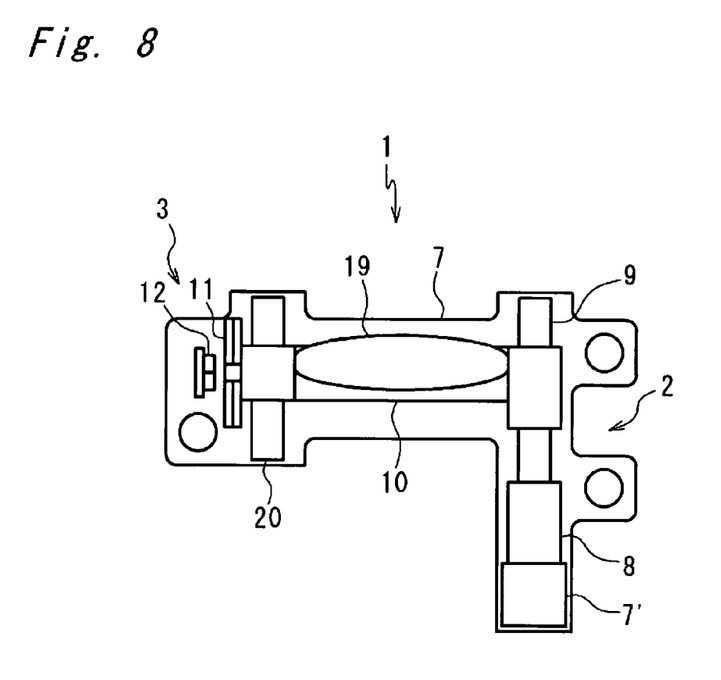
FIG. 8 is a plan view showing a specific shape of the positioning device of FIG. 1.

FIG. 8 shows the specific shape of the positioning device 1. In the positioning device 1, the movable member 10, which is a lens mounting rim for holding a lens 19 that is an optical element, is movable along a hanging shaft 20 parallel to the drive member 9 fixed to the base member 7. The magnetic field generating member 11 is attached to the part of the movable member 10 which engages with the hanging shaft 20. The base member 7 is fixed to the electromechanical transducer 8 via a fixed member 7' and to the magnetic field detection means 12 so as to face the magnetic field generating member 11.

Although the positioning device 1 constituted in this way is small and lightweight, the position of the lens 19 held by the movable member 10 in the direction of the hanging shaft 20 can be detected correctly, and the lens 19 can be positioned at a desired position by the piezoelectric actuator 2.

Figure 9:
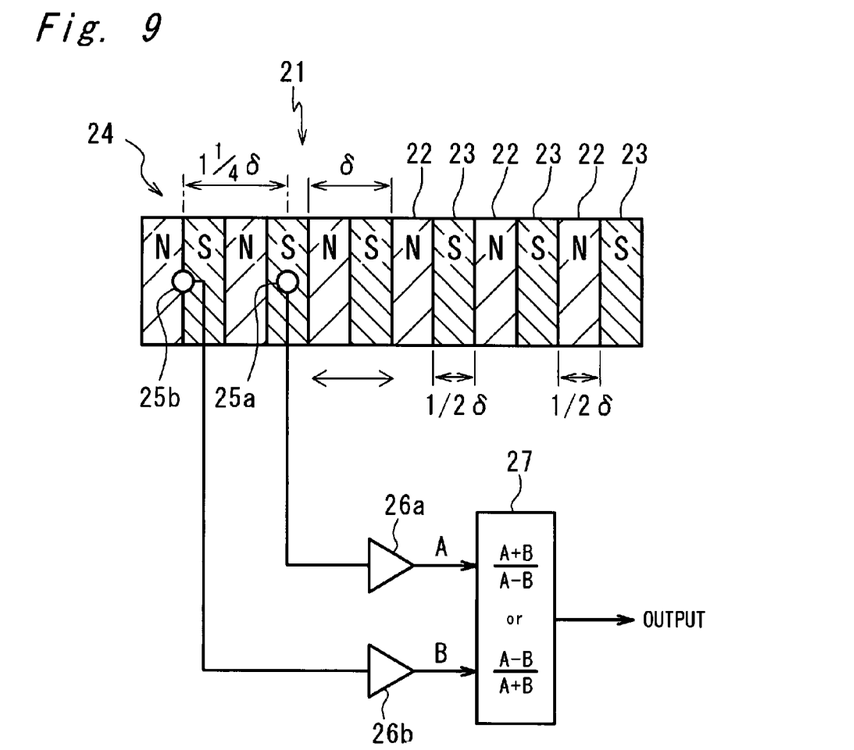
FIG. 9 is a schematic view showing the structure of an encoder in a second embodiment of the present invention.

FIG. 9 is a schematic view of an encoder 21 in the second embodiment of the present invention. The encoder 21 includes a magnetic field generating member 24 having an N-pole portion 22 with a width of ½ δ magnetized to be N-pole and an S-pole portion 23 with a width of ½ δ magnetized to be S-pole, which are repeatedly placed in an alternate manner, and two magneto-resistive elements (magnetic field detecting elements) 25a and 25b. The magneto-resistive elements 25a and 25b are placed at an interval of (1+¼) δ. Detection signals A and B of the magneto-resistive elements 25a and 25b amplified by amplifier 26a and 26b undergo arithmetic processing in an arithmetic unit (operation means) 27 before being outputted.

Figure 10:
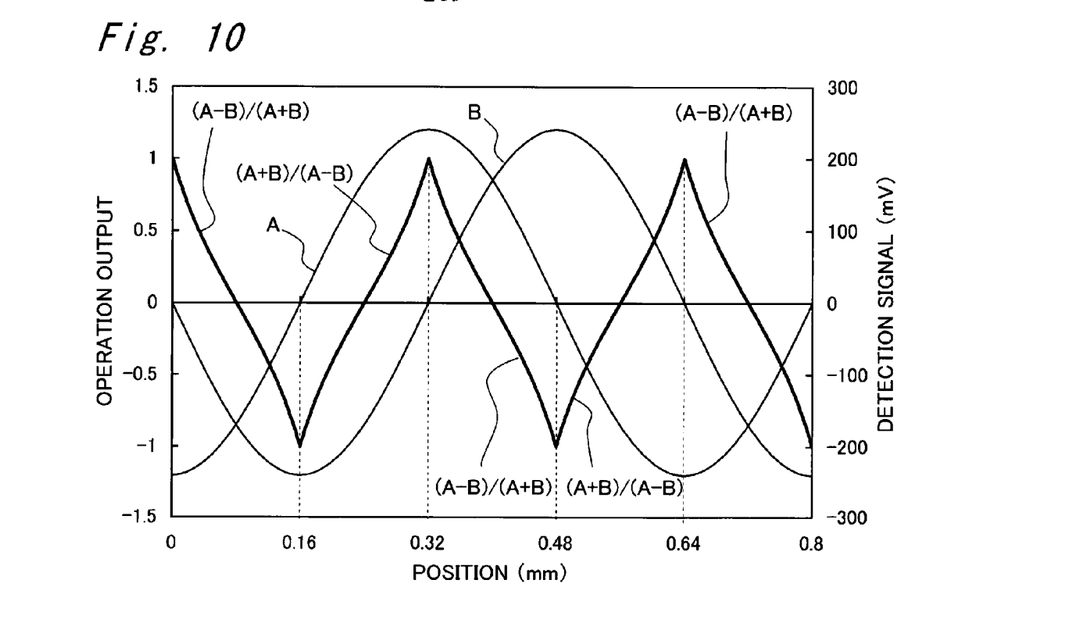
FIG. 10 is a graph view showing an output waveform of the encoder of FIG. 9.

FIG. 10 shows detection signals A and B of the magneto-resistive elements 25a and 25b in the case where the width (½ δ) of the N-pole portion 22 and the S-pole portion 23 is 0.32 mm as well as outputs of the arithmetic unit 27 to explain the characteristics of the encoder 21. The detection signal A and the detection signal B take cyclic waveforms like sinusoidal waves with their phases shifted 90 degrees (¼ δ) from each other with respect to the position of the magnetic field generating member 24.

When both the detection signals A and B are 0 or more, and when both the detection signals A and B are 0 or less, i.e., when the polarities of the magnetic fields detected by the two magneto-resistive elements 25a and 25b are identical, the arithmetic unit 27 outputs the operation result of (A−B)/(A+B), whereas when either the detection signal A or B is less than 0, i.e., when the polarities of the magnetic fields detected by the Magneto-resistive elements 25a and 25b are different, the arithmetic unit 27 outputs the operation result of (A+B)/(A−B).

Since the operation results of (A−B) and (A+B) have a position where their outputs become 0 in every 180-degree (i.e., ½ δ) phase, and since the phases of the detection signal A and the detection signal B are out of alignment by 90 degrees (i.e., ¼ δ), the operation result of (A−B) and the operation result of (A+B) alternately become 0 in every 90-degree (i.e., ¼ δ) phase. If the sum (A+B) of both the detection signals A and B is divided by a difference (A−B) as in the conventional arithmetic method, then a denominator (A−B) is set to 0 in every ½ δ phase, and the output is dispersed. However, as in the present embodiment, if the difference (A−B) between both the detection signals A and B is divided by the sum (A+B) at the position where the detection signal A and the detection signal B become equal, a linear output can be obtained. When the detection signal A or the detection signal B is 0, both the operation of (A−B)/(A+B) and the operation of (A+B)/(A−B) output an identical value, 1 or −1, and therefore switching the operation of (A−B)/(A+B) and the operation of (A+B)/(A−B) at this point makes it possible to obtain continuous outputs. As a result, the output of the arithmetic unit 27 draws a waveform close to a triangular wave with cycles of ½ δ as shown in the drawing.

Moreover, since the arithmetic unit 27 divides the sum of the detection signals A and B by the difference therebetween or divides the difference between the detection signals A and B by the sum thereof, the output of the encoder 21 becomes a dimensionless variable, and so even if there is a change in the strength of a magnetic field generated by the magnetic field generating member 24 due to temperature change, the output of the encoder 21 is free from fluctuation. Accordingly, with linearization, the position of the magnetic field generation section 24 can be calculated in a unit smaller than the width (¼ δ) of the N-pole portion 22 and the S-pole portion 23.

Although the present invention has fully been described with illustrative methods with reference to accompanying drawings, various arrangements and modifications shall be possible for the person skilled in the art. Therefore, it should be understood that such arrangements and modifications that come within the scope and the spirit of the present invention are intended to be embraced therein.

The invention claimed is:

1. A position detector, comprising:
   a magnetic field generating member comprising an N-pole portion magnetized to be north pole; an S-pole portion magnetized to be south pole located side by side with the N-pole portion in a movable direction; and a non-magnetized portion which is not magnetized and which is located between the N-pole portion and the S-pole portion, and attached to a movable member movable in the movable direction;
   a magnetic field detector having two magnetic field detecting elements juxtaposed in the movable direction for detecting a change of magnetic field caused by movement of the magnetic field generating member; and
   an operation device which carries out an operation of:

$(A-B)/(A+B)+2$ if $A>0$;

$(A-B)/(A+B)-2$ if $B<0$; and $(B+A)/(B-A)$ if $A \leq 0$ and $B \geq 0$, wherein A represents a smaller detection signal and B represents a larger detection signal in a linear range, out of detection signals by the two magnetic field detecting elements.

2. The position detector according to claim 1, wherein a length of the non-magnetized portion in the movable direction is 1/10 or more and 1/3 or less of an overall length of the magnetic field generating member.

3. The position detector according to claim 1, wherein each magnetic field detecting element is a Hall element.

4. A positioning device, comprising the position detector of claim 3, wherein:
   the movable member being in frictional engagement with a drive shaft which is moved backward and forward in the movable direction by a piezoelectric actuator wherein,
   the piezoelectric actuator has an electromechanical transducer expanded and contracted in the movable direction, for slidably moving the movable member on the drive shaft by changing a rate of expansion and contraction of the electromechanical transducer.

5. The positioning device according to claim 4, wherein the movable member holds an optical element.

6. A positioning device, comprising the position detector of claim 1, wherein:
   the movable member being in frictional engagement with a drive shaft which is moved backward and forward in the movable direction by a piezoelectric actuator wherein,
   the piezoelectric actuator has an electromechanical transducer expanded and contracted in the movable direction, for slidably moving the movable member on the drive shaft by changing a rate of expansion and contraction of the electromechanical transducer.

7. The positioning device according to claim 6, wherein the movable member holds an optical element.

8. The position detector according to claim 2, wherein each magnetic field detecting element is a Hall element.

9. The position detector according to claim 2, wherein each magnetic field detecting element is a magneto-resistive element.

10. A position detector, comprising:
    a magnetic field generating member attached to a movable member movable in a predetermined movable direction; and
    a magnetic field detector detecting a change of magnetic field caused by movement of the magnetic field generating member,
    wherein the magnetic field detector has two magnetic field detecting elements juxtaposed in the movable direction for detecting a change of magnetic field,
    the position detector further comprising an operation device for carrying out operations of:

$(A-B)/(A+B)+2$ if $A>0$;

$(A-B)/(A+B)-2$ if $B<0$; and $(B+A)/(B-A)$ if $A \leq 0$ and $B \geq 0$, wherein A represents a smaller detection signal and B represents a larger detection signal in a linear range, out of detection signals by the two magnetic field detecting elements.

11. The position detector according to claim 10, wherein each magnetic field detecting element is a Hall element.

12. A positioning device, comprising the position detector of claim 10, wherein:
    the movable member being in frictional engagement with a drive shaft which is moved backward and forward in the movable direction by a piezoelectric actuator wherein,
    the piezoelectric actuator has an electromechanical transducer expanded and contracted in the movable direction, for slidably moving the movable member on the drive shaft by changing a rate of expansion and contraction of the electromechanical transducer.

13. The positioning device according to claim 12, wherein the movable member holds an optical element.

14. A positioning device, comprising the position detector of claim 11, wherein:
    the movable member being in frictional engagement with a drive shaft which is moved backward and forward in the movable direction by a piezoelectric actuator wherein,
    the piezoelectric actuator has an electromechanical transducer expanded and contracted in the movable direction, for slidably moving the movable member on the drive shaft by changing a rate of expansion and contraction of the electromechanical transducer.

15. The positioning device according to claim 14, wherein the movable member holds an optical element.

16. The position detector according to claim 10, wherein each magnetic field detecting element is a magneto-resistive element.

* * * * *